United States Patent
Kucharyson

(10) Patent No.: US 7,840,130 B2
(45) Date of Patent: Nov. 23, 2010

(54) MESH COMMUNICATION WIRELESS CAMERA SYSTEM AND METHOD

(75) Inventor: Richard P. Kucharyson, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 323 days.

(21) Appl. No.: 11/729,215

(22) Filed: Mar. 28, 2007

(65) Prior Publication Data

US 2008/0240696 A1 Oct. 2, 2008

(51) Int. Cl.
G03B 17/00 (2006.01)

(52) U.S. Cl. .......... 396/56; 348/159; 725/12; 725/120

(58) Field of Classification Search .......... 396/56, 396/427, 428, 279; 348/211.5, 211.6; 725/12, 725/19, 120
See application file for complete search history.

(56) References Cited

U.S. PATENT DOCUMENTS

| | | | | |
|---|---|---|---|---|
| 5,713,050 A * | 1/1998 | Ozawa | ............... | 396/56 |
| 6,970,183 B1 * | 11/2005 | Monroe | ............... | 348/143 |
| 7,035,313 B2 * | 4/2006 | Fry | ............... | 375/132 |
| 7,139,218 B2 * | 11/2006 | Hall et al. | ............... | 367/82 |
| 7,296,286 B2 * | 11/2007 | Osawa | ............... | 725/105 |
| 7,298,964 B2 * | 11/2007 | Ishikawa et al. | ............... | 386/117 |
| 7,495,687 B2 * | 2/2009 | DuMas et al. | ............... | 348/143 |
| 7,502,546 B2 * | 3/2009 | Elberbaum | ............... | 386/92 |
| 2002/0147982 A1 * | 10/2002 | Naidoo et al. | ............... | 725/105 |
| 2003/0086000 A1 | 5/2003 | Siemens et al. | | |
| 2004/0004542 A1 | 1/2004 | Faulkner et al. | | |
| 2006/0001744 A1 * | 1/2006 | Singh | ............... | 348/207.99 |
| 2006/0095539 A1 | 5/2006 | Renkis | | |
| 2006/0143671 A1 * | 6/2006 | Ens et al. | ............... | 725/105 |
| 2006/0253885 A1 | 11/2006 | Murphy et al. | | |
| 2007/0003146 A1 | 1/2007 | Ko et al. | | |
| 2008/0112699 A1 * | 5/2008 | Huseth et al. | ............... | 396/89 |

FOREIGN PATENT DOCUMENTS

WO    WO 02/30108 A1    4/2002

* cited by examiner

*Primary Examiner*—Clayton E LaBalle
*Assistant Examiner*—Linda B Smith
(74) *Attorney, Agent, or Firm*—Munck Carter, LLP

(57) ABSTRACT

A system includes a camera and a monitoring system that are capable of wireless communication. The camera is operable to send a message to the monitoring system via a plurality of wireless communication paths. The message includes information relating to an operational status of the camera. The camera may generate and analyze a video signal and the message may include information relating to the analysis of the video signal. The camera may be one of a plurality of cameras capable of generating video signals. The system may further include an intermediate node capable of wireless communication with the cameras and the monitoring system. The intermediate node may multiplex the video signals from the cameras to the monitoring system.

20 Claims, 3 Drawing Sheets

MESH COMMUNICATION WIRELESS CAMERA SYSTEM AND METHOD

CROSS REFERENCE TO RELATED APPLICATIONS

This patent application is related to U.S. patent application Ser. No. 11/729,285 entitled "SELF-CONTAINED WIRELESS SECURITY SENSOR COLLECTIVE SYSTEM AND METHOD" filed on Mar. 28, 2007, which is incorporated by reference.

TECHNICAL FIELD

This disclosure relates generally to security cameras and more specifically to a mesh communication wireless camera system and method.

BACKGROUND

A process plant is a complex, multifaceted entity, a structured organization of physical elements, operated for economic and other criteria that are often industry-specific. A process plant has a number of different stakeholders who can affect and/or are affected by its operation. Critical to the operation of many process plants today is a process control system, which ensures that appropriate parameters are measured and actions taken, plant personnel are kept informed, abnormal situations are identified and addressed, and business processes are integrated. Automation and control systems are employed in diverse applications, such as refining and petrochemical plants, the petroleum and natural gas supply chain, pulp and paper manufacturing, electrical power generation, chemical production, food production, wastewater treatment, discrete product manufacturing, cable-laying ships, tunnel ventilation control, and mining operations.

In many process control applications the cost of running wires from nodes such as sensors, actuators and user interfaces to the process control system limits the number and location of such nodes initially deployed. Cost and difficulty of wiring installation may also limit the deployment of additional nodes in an already-functioning plant. The recent development of wireless communication technologies, such as Bluetooth, IEEE® 802.11, RFID and others, promises a solution to such wiring costs, but not without introducing new challenges to the reliability and security of a process control system.

The ambient environment of a process plant may interfere with or prevent wireless communication between a sensor, actuator or user interface location and the process control system, making it difficult to connect a wireless node. Individual messages may be lost, or changes to the physical plant or electrical environment may prevent communication where it was previously possible, resulting in unreliable communication.

One of the top priorities at an industrial facility is security. Perimeter security, access controls, and communication systems may be elements of a security system at an industrial facility.

Sensors in a security system may include cameras, access readers and motion sensors. However, the costs of installing cables and wires to such sensors for power and data communications are generally high. Such costs may serve as a disincentive to an industrial facility owner to operate an effective security monitoring and alarm system.

Some industrial facilities and other commercial facilities have miles of perimeter to monitor, and security cameras may be required every 100 to 200 feet along the perimeter. Thus, 25 to 50 security cameras, along with associated power and data cables and trenches in which to install the cables, may be required for every mile of facility perimeter.

Furthermore, monitoring such a multitude of cameras may require a complex monitoring system. Data from each sensor may be routed to a single control center for monitoring and alarm generation. Both human and equipment costs for such monitoring may be high. As a result, current security monitoring systems may have high installation costs and monitoring costs when used in an industrial facility. Furthermore, where implemented with wireless communication, the communication reliability of current security monitoring systems may be low.

SUMMARY

This disclosure provides a mesh communication wireless camera system and method.

In a first embodiment, a system includes a camera and a monitoring system. The camera and the monitoring system are capable of wireless communication. The camera is operable to send a message to the monitoring system via a plurality of wireless communication paths.

In particular embodiments, the camera is operable to generate a video signal and to analyze the video signal. The message includes information relating to the analysis of the video signal.

In other particular embodiments, the camera is one of a plurality of cameras capable of generating video signals, and the system further includes an intermediate node. The intermediate node is capable of wireless communication with the plurality of cameras and the monitoring system. The intermediate node is operable to multiplex the video signals from the cameras to the monitoring system.

In yet other particular embodiments, the message includes information relating to an operational status of the camera.

In a second embodiment, a camera includes a controller and a wireless interface. The controller is operable to send a message via the wireless interface to a monitoring system via a plurality of wireless communication paths.

In a third embodiment, a method includes providing a camera capable of wireless communication. The method further includes sending a message from the camera to a monitoring system via a plurality of wireless communication paths.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
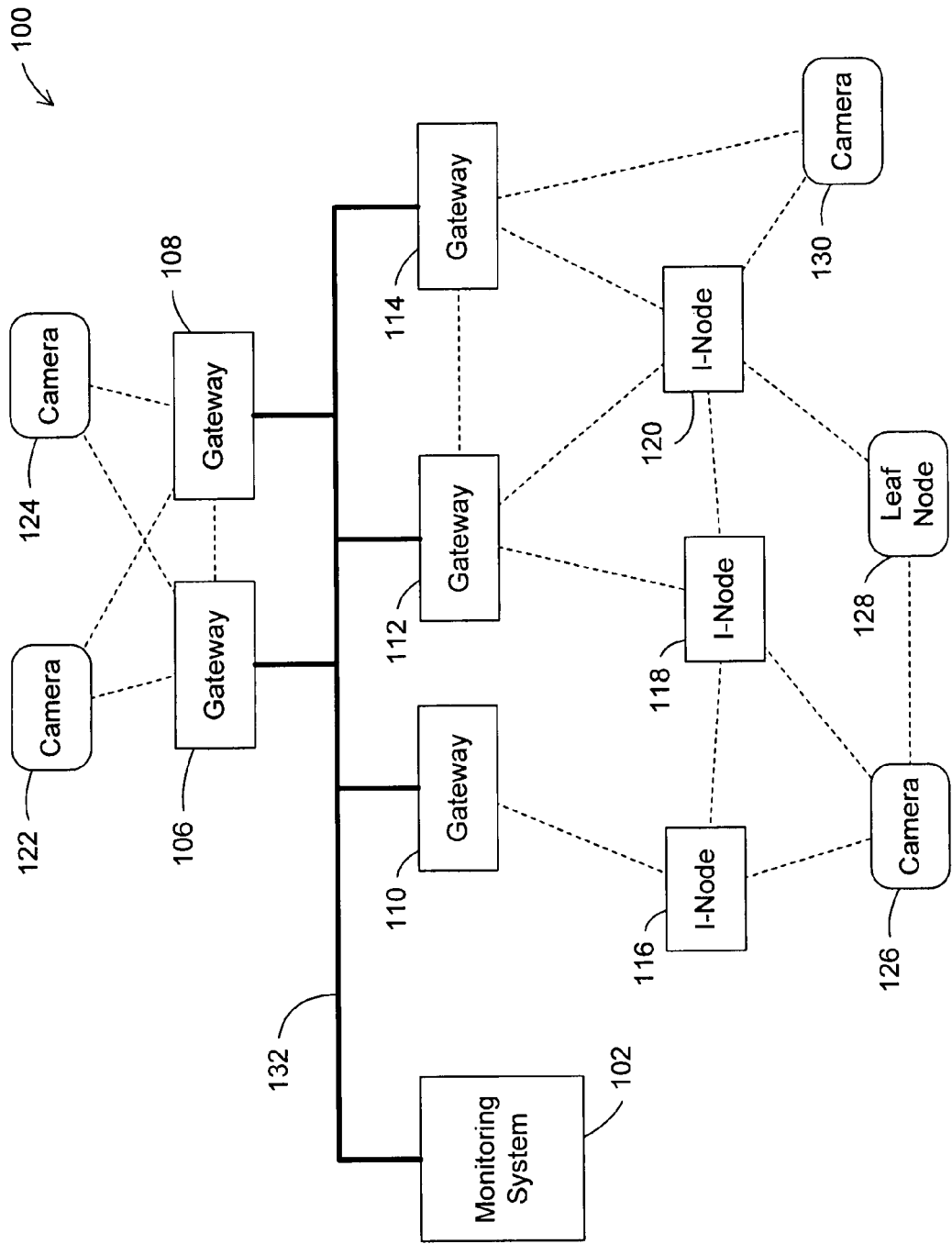
FIG. 1 illustrates a mesh communication wireless camera system according to one embodiment of this disclosure.

FIG. 1 illustrates an example mesh communication wireless camera system 100 according to one embodiment of this disclosure. The embodiment of the system 100 shown in FIG. 1 is for illustration only. Other embodiments of the system 100 could be used without departing from the scope of this disclosure.

In this example, the mesh communication wireless camera system 100 could be used in any suitable type of security or process monitoring application. For example, the system 100 could be used in a building, an industrial facility or an urban environment. Although the mesh communication wireless camera system 100 may be described below as being used in an industrial facility, the system 100 could be used in any of these or other environments. Also, although the system 100 may be described below as being used to detect physical invasion, the system 100 may be used to detect fire, machine failure, process failures and other alarm conditions.

In addition, the mesh communication wireless camera system 100 could use any suitable wireless signals to communicate. Although the system 100 may be described below as using radio frequency (RF) signals to communicate, the system 100 could use any other or additional type of wireless signal.

In this example, the system 100 includes a monitoring system 102 communicating via a network 132. The network 132 may be Ethernet, FAULT TOLERANT ETHERNET, or other suitable network. The system 100 also includes gateway nodes 106-114, which communicate with each other and with the monitoring system 102 via network 132. Gateway nodes may also communicate wirelessly with each other. Wireless communication paths are indicated in FIG. 1 by dashed lines. Intermediate nodes 116-120, also referred to as I-Nodes, are able to communicate wirelessly with gateway nodes and with each other. Cameras 122-126 and 130 and sensor/actuator 128 (referred to collectively as leaf nodes 122-130) are able to communicate wirelessly with gateway nodes and with intermediate nodes.

In some embodiments, the monitoring system 102 may be a process data consumer, that is, a component that only consumes process data sent by the leaf nodes 122-130. Process data consumers include security monitoring systems, man-machine interfaces and plant historians, among others. In other embodiments, the monitoring system 102 may be a process controller, which both sends and receives information to the leaf nodes 122-130. Process controllers are also process data consumers. While the system 100 includes both cameras and process control components such as sensors and actuators, it will be understood that other embodiments of the system 100 could include only cameras without departing from the scope of this disclosure.

As shown in FIG. 1, the wireless devices of a distributed control system according to the present disclosure may be grouped into separate networks by physical proximity or by frequency allocation. For example, the cameras 122 and 124 and the gateway nodes 106 and 108 form a subnetwork that is separate from the subnetwork formed by the gateway nodes 110-114, the intermediate nodes 116-120, and the leaf nodes 126-130. Where leaf nodes are distributed over a large area, gateway nodes and I-Nodes may be physically located to provide wireless communication with all leaf nodes. In the alternative, where a large number of leaf nodes are located close to each other, the leaf nodes may be separated into subnetworks by frequency allocation to prevent the high volume of wireless traffic from, for example, reducing the rate at which a camera can supply information to the monitoring system 102.

In some embodiments, when the system 100 is installed, each leaf node 122-130 may be bound to a specified pair of the gateway nodes 106-114. In this way, the process of finding a communication path between the leaf node and each of its gateway nodes may be made more efficient. A fixed mapping of leaf nodes to gateways may be stored in the monitoring system 102 or in a node connected to network 132 for quick access by any component of the system 100 seeking to establish communication with a leaf node. In the alternative, leaf nodes may determine communication paths to any two gateway nodes that may be reached, and those gateway nodes then report that they can provide communication to that leaf node.

It can also be seen from FIG. 1 that redundant wireless communication pathways are provided where possible, to improve the reliability of communication between process control system components and leaf nodes. While some intermediate nodes in FIG. 1 are only able to communicate wirelessly with a single gateway node (for example the I-Node 116 and the gateway node 110), a wireless communication network could typically enable each leaf node to communicate with two or more I-Nodes and with two or more gateway nodes. In this way, single points of failure in the process control system are reduced or eliminated.

Furthermore, a gateway or I-Node may receive video signals from more than one camera. Such a gateway or I-Node may operate to multiplex the video signals from those cameras by sending the video signal from only one camera at a time to the monitoring system 102. Switching from camera to camera may occur at specified time intervals, upon command from the monitoring system or upon an alarm signal issued by one of the cameras. Such multiplexing may reduce the load placed upon the communication bandwidth of wireless communication links and the network 132 by transmission of video signals to the monitoring system 102.

Figure 2:
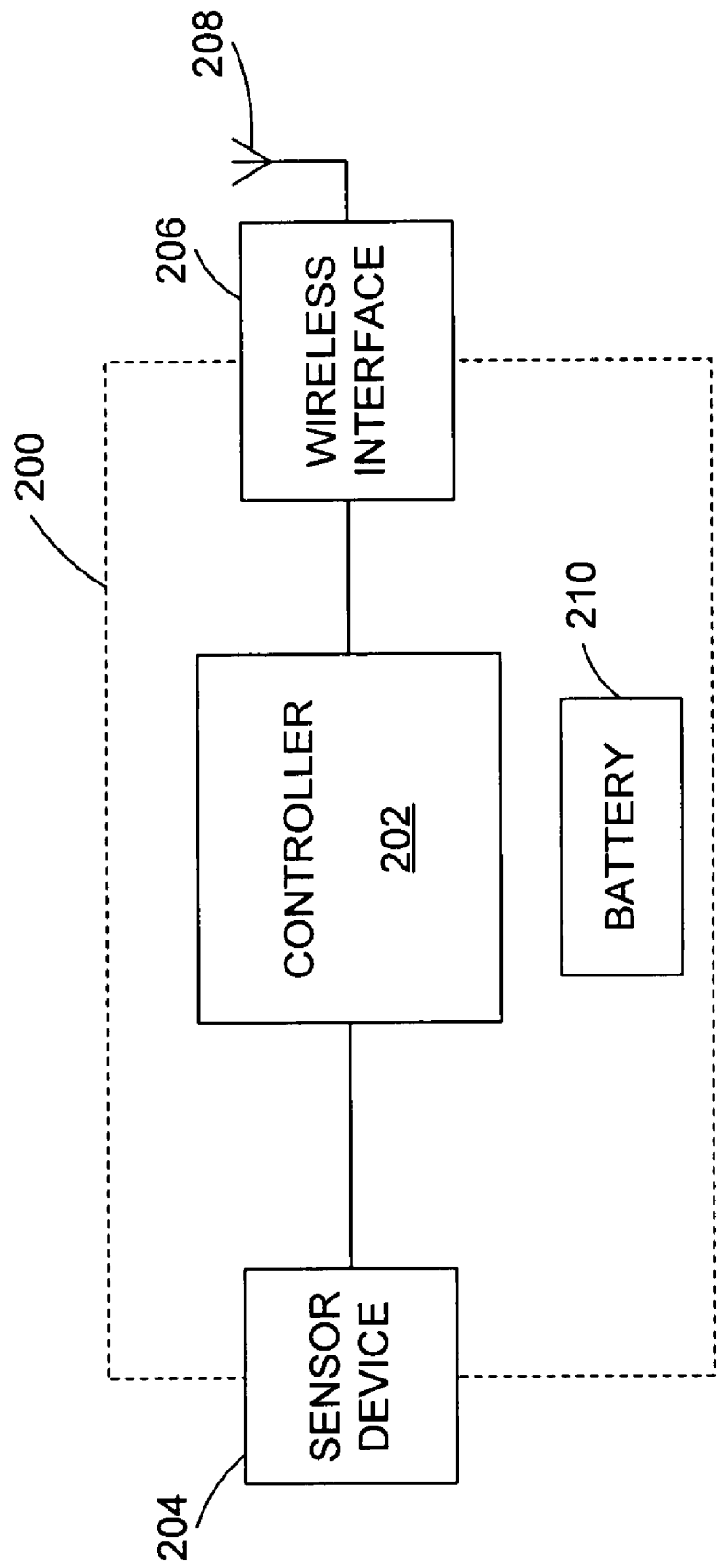
FIG. 2 illustrates an example camera according to one embodiment of this disclosure.

FIG. 2 illustrates an example camera 200 according to one embodiment of this disclosure. The embodiment of the camera 200 shown in FIG. 2 is for illustration only. Other embodiments of the camera 200 could be used without departing from the scope of this disclosure.

In this example, the camera 200 includes a sensor device 204, a controller 202 and a wireless interface 206. A battery 210 may power the components of the camera 200. The sensor device 204 may be a device that generates still images or a video signal. The sensor device 204 may respond to visible light or to other regions of the electromagnetic spectrum, such as infrared.

The controller 202 is coupled to the sensor device 204 and receives signals corresponding to information sensed by the sensor device 204, which information relates to the environment in which the sensor device 204 is operating. The controller 202 may analyze the still images or video signal from the sensor device 204 to detect the presence of an intruder or to detect a failure of the camera or interference with the proper operation of the camera. Such analysis may produce an alarm signal or other message relating to the results of the analysis.

Other circuitry of the controller 202 may monitor the operational status of the camera 200. Status information regarding the camera 200 may include information relating to the charge status of the battery 210 or self-testing diagnostic programs executed by the controller 202.

The controller 202 is also coupled to the wireless interface 206. The controller 202 may send a message relating to a still or video image received from the sensor device 204, or an alarm or status message generated by the controller 202 via the wireless interface 206. The wireless interface 206 may transmit an RF or other signal via an antenna 208 to another leaf node, an I-Node or a gateway.

Figure 3:
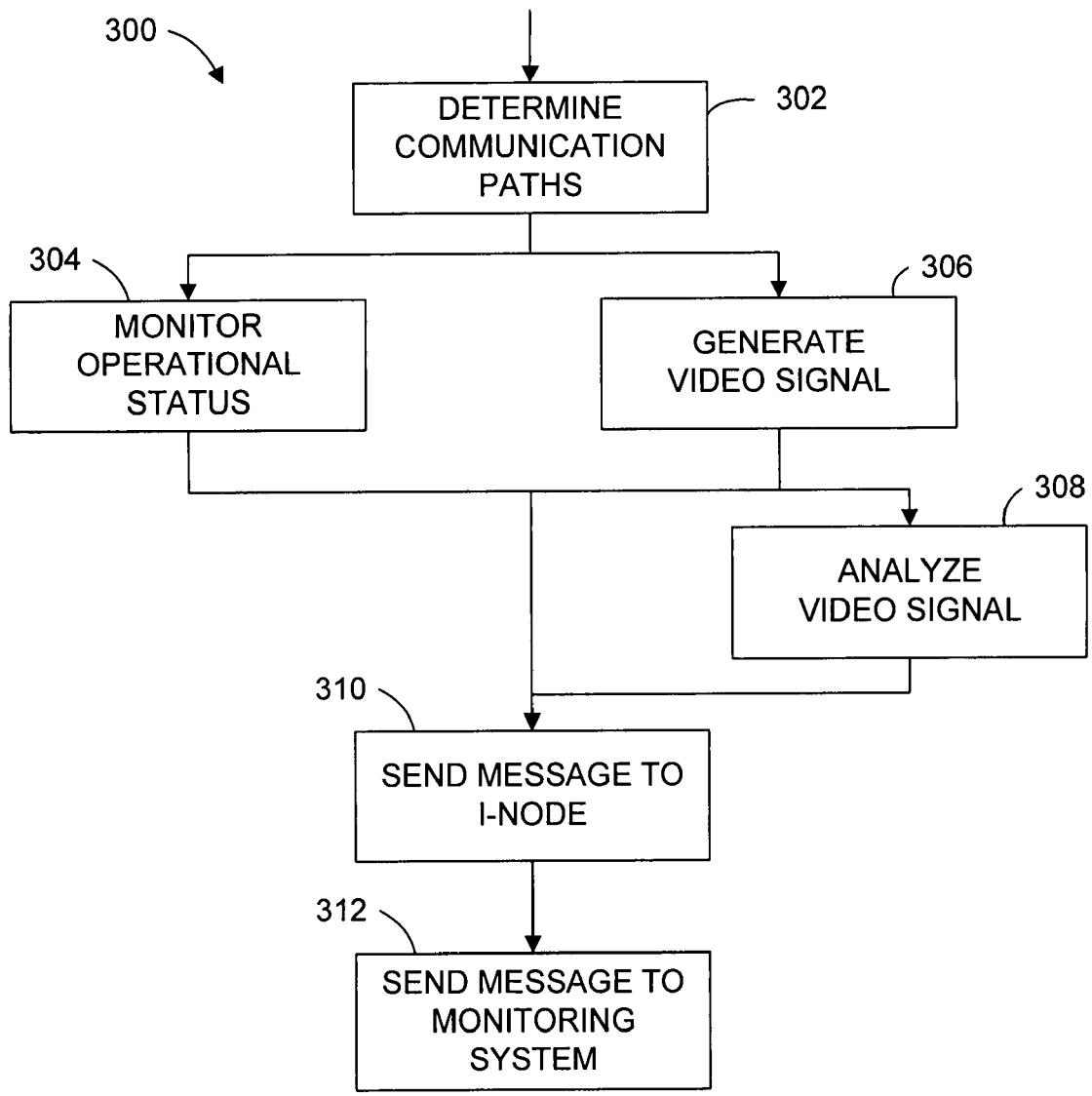
FIG. 3 illustrates example actions performed by components of a mesh communication wireless camera system according to one embodiment of this disclosure.

FIG. 3 illustrates example actions 300 performed by the mesh communication wireless camera 200 and the system 100 according to one embodiment of this disclosure. In step 302, the camera 200 may determine communication paths by which it can communicate with the monitoring system 102. In some embodiments, the camera 200 may establish wireless communication with an I-Node or a gateway and receive previously mapped communication paths stored in the monitoring system 102 on another node connected to network 132. In other embodiments, the camera 200 may establish wireless communication with a nearby I-Node or gateway and then exchange messages through those nodes with other nodes of the system 100 in order to discover one or more communication paths to the monitoring system 102. Where more than one path is discovered, one or more preferred paths may be selected based upon criteria such as path length or path signal quality.

The determination of communication paths in step 302 may be performed at startup of the camera 200 or when the camera 200 discovers that previously determined communication paths are impaired or no longer functional. Having determined communication paths, the camera may then perform steps 304 and 306. In step 304, the camera 200 may monitor its operational status. Step 304 may comprise the controller 202 performing diagnostic procedures to establish the operation or failure of circuit elements of the camera 200. Step 304 may also comprise determining a charge level of the battery 210. Further in step 304, the controller 202 may create a message comprising information relating to its operational status monitoring operations.

In step 306, the controller 202 or other circuitry of the camera 200 may request or receive a signal from the sensor device 204. The controller 202 may perform further processing on the received signal to generate a video signal or image representing the scene viewed by the sensor device 204. Under the control of a program stored in the camera 200 or commands received from the monitoring system 102, the camera 200 may continuously send still images or video signals generated in step 306 to the monitoring system 102. Also under program control or command from the monitoring system 102, the camera 200 may send a reduced quantity of information to the monitoring system. For example, video images may be compressed or their resolution or frame rate reduced.

In step 308, the controller 202 or other circuitry of the camera 200 may analyze the video signal generated in step 306 to detect specified conditions. For example, the video image may be analyzed to detect an intruder, fire, smoke or other anomalous conditions. The controller may create a message comprising information relating to its analysis of the vide signal. Such a message may be a small alarm message comprising the nature of the condition detected and its location or it may be a larger message comprising the video image and notations indicating the area of the image in which the specified condition was observed.

Messages created in steps 304, 306 and 308 may be sent to an I-Node in step 310. Where one of the communication paths determined in step 302 includes a link from the camera 200 directly to a gateway (as may be seen between the camera 130 and the gateway 114 in FIG. 1), the message may be sent to the gateway in step 310. The camera 200 may then return to steps 304 and 306 or, if problems have been detected with one or more of the communication paths to the monitoring system 102, to step 302.

In step 312, the I-Node or gateway may send the message on to the monitoring system 102. Where an I-Node or gateway (node) is receiving messages from more than one camera, the node may perform analysis of the content or nature of the received messages before sending them on to the monitoring system 102. For example, where real-time video signals are received from a plurality of cameras, the node may multiplex the video signals, sending portions of the signals in sequence to the monitoring system 102. The node may also prioritize the received messages and send those having a higher priority (for example, an alarm message) in preference to those having a lower priority (for example, a battery charge level message).

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A system, comprising:
multiple cameras, each operable to generate a video signal;
an intermediate node operable to communicate wirelessly with at least some of the cameras;
a monitoring system; and
multiple gateway nodes each operable to communicate with the monitoring system over a wired network and to communicate with at least some of the cameras;
wherein:
the cameras and the gateway nodes are operable to communicate wirelessly;

each of the cameras is operable to send a message to the monitoring system via a plurality of wireless communication paths and at least one of the gateway nodes;

a first subset of the cameras and gateway nodes operate in a first wireless subnetwork and a second subset of the cameras and gateway nodes operate in a second wireless subnetwork;

the monitoring system comprises a process controller;

the messages comprise alarm messages; and the intermediate node is operable to multiplex the video signals from the cameras to the monitoring system by sending the video signal from only one camera at a time to the monitoring system, wherein the multiplexing is based at least upon an alarm signal issued by one of the cameras.

2. The system of claim 1, wherein the cameras and the gateway nodes are further operable to exchange wireless messages to determine the plurality of wireless communication paths.

3. The system of claim 1, wherein each of the cameras is operable to analyze its video signal, and wherein the messages comprise information relating to the analysis of the video signals.

4. The system of claim 1, wherein the messages comprise information relating to an operational status of the cameras.

5. The system of claim 1, wherein the cameras are separated into the subnetworks by frequency allocation.

6. The system of claim 1, wherein the cameras and the gateway nodes are operable to communicate wirelessly via a mesh communication wireless system.

7. The system of claim 4, wherein each of the cameras is powered by a battery, and the information relating to the operational status of one of the cameras comprises information relating to a charge level of the battery powering that camera.

8. A camera, comprising:

a controller; and a wireless interface;

wherein:

the controller is operable to send a video signal and a first message via the wireless interface to a monitoring system via a plurality of wireless communication paths including at least one intermediate node that is operable to multiplex video signals from a plurality of cameras to the monitoring system by sending the video signal from only one camera at a time to the monitoring system;

the wireless interface is operable to communicate within a first wireless subnetwork that includes a first gateway node operable to communicate with the monitoring system over a wired network, the first wireless subnetwork separate from a second wireless subnetwork in which another camera communicates a second message to the monitoring system via a second gateway node;

the monitoring system comprises a process controller; and the first message comprises an alarm message configured to cause the intermediate node to multiplex video signals based upon the alarm signal.

9. The camera of claim 8, wherein the controller is further operable to exchange wireless messages via the wireless interface to determine the plurality of wireless communication paths.

10. The camera of claim 8, wherein the controller is operable to send the first message to the monitoring system via a plurality of intermediate nodes.

11. The camera of claim 8, wherein:

the controller is operable to analyze the video signal; and the first message comprises information relating to the analysis of the video signal.

12. The camera of claim 8, wherein the first message comprises information relating to an operational status of the camera.

13. The system of claim 8, wherein the plurality of wireless communication paths comprises a mesh communication wireless system.

14. The camera of claim 12, wherein the camera is powered by a battery, and the information relating to the operational status of the camera comprises information relating to a charge level of the battery.

15. A method, comprising:

providing a camera capable of wireless communication, wherein the camera is one of a plurality of cameras;

sending a first message from the camera via a plurality of wireless communication paths in a first wireless subnetwork to a first gateway node operable to communicate with a monitoring system over a wired network, the first wireless subnetwork separate from a second wireless subnetwork in which another camera communicates a second message to the monitoring system via a second gateway node, wherein the monitoring system comprises a process controller and the first message comprises an alarm message;

generating video signals in the plurality of cameras;

sending the video signals from the plurality of cameras to the monitoring system via an intermediate node capable of communicating wirelessly with the monitoring system and the plurality of cameras; and multiplexing the video signals from the plurality of cameras to the monitoring system in the intermediate node by sending the video signal from only one camera at a time to the monitoring system, wherein the multiplexing is based at least upon an alarm signal issued by one of the cameras.

16. The method of claim 15, further comprising exchanging wireless messages to determine the plurality of wireless communication paths.

17. The method of claim 15, further comprising:

analyzing the video signal in the camera;

wherein the first message comprises information relating to the analysis of the video signal.

18. The method of claim 15, wherein the first message comprises information relating to an operational status of the camera.

19. The system of claim 15, wherein the plurality of wireless communication paths in the first wireless subnetwork comprises a mesh communication wireless system.

20. The method of claim 18, wherein the camera is powered by a battery, and the information relating to the operational status of the camera comprises information relating to a charge level of the battery.

* * * * *